Jan. 27, 1959  B. W. BIRMINGHAM ET AL  2,871,042
SUPPORTING AND HEAT INSULATING MEANS
Filed June 2, 1954  2 Sheets-Sheet 1
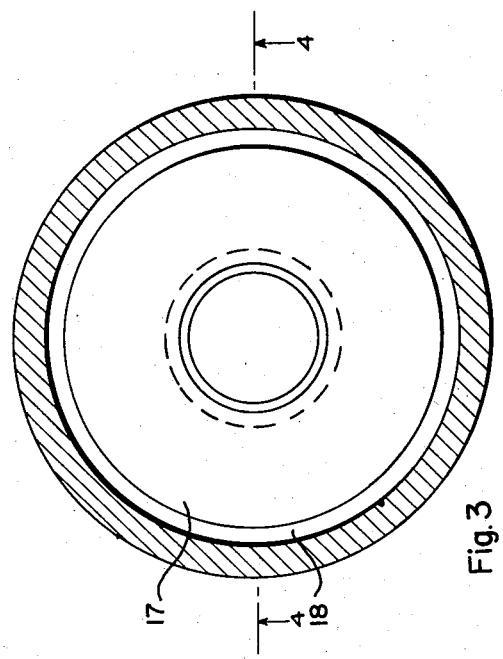
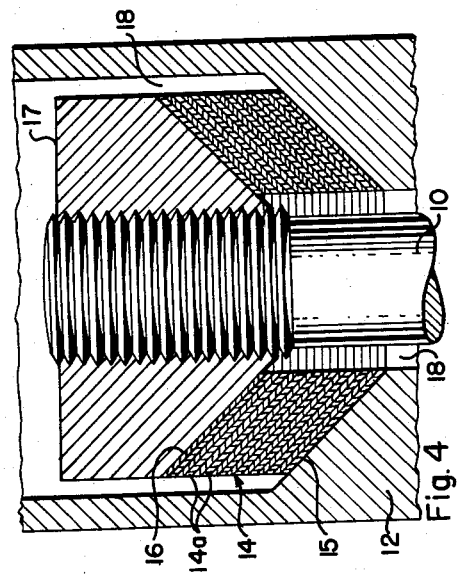
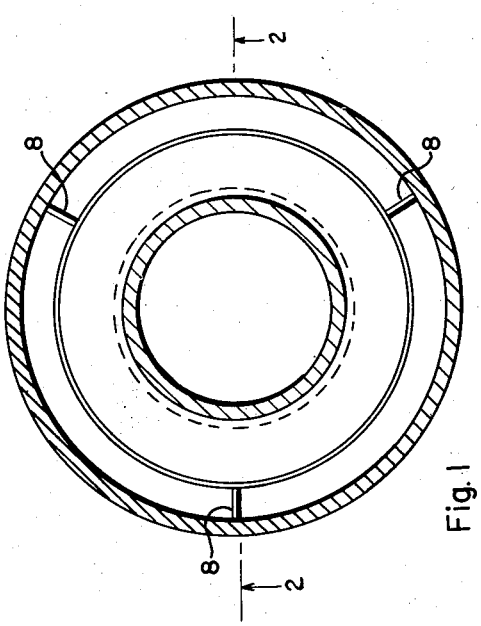
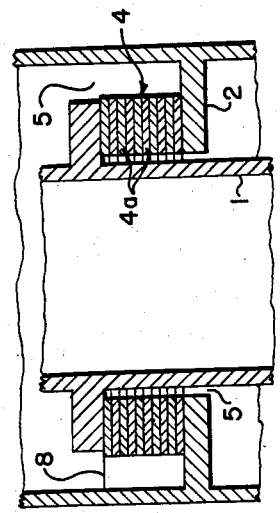
INVENTORS.
Bascom W. Birmingham
Edmund H. Brown
Russell B. Scott
Peter C. Vander Arend
BY , ATTORNEY

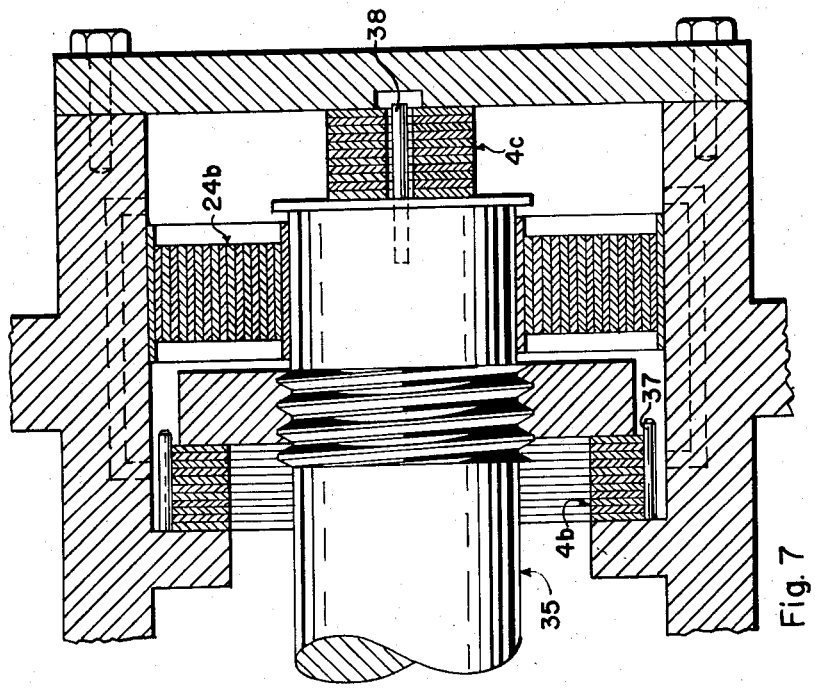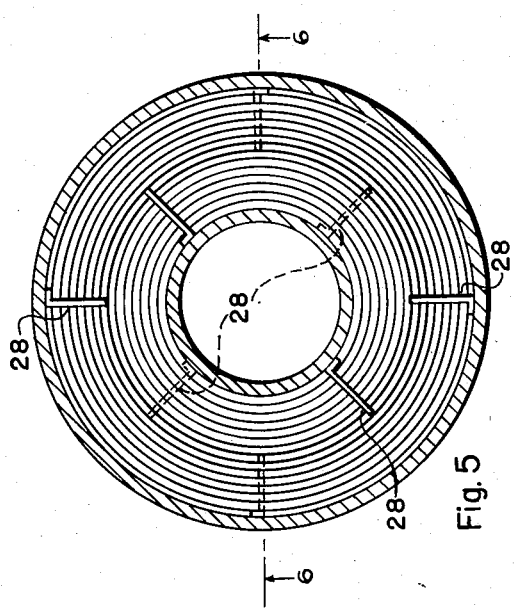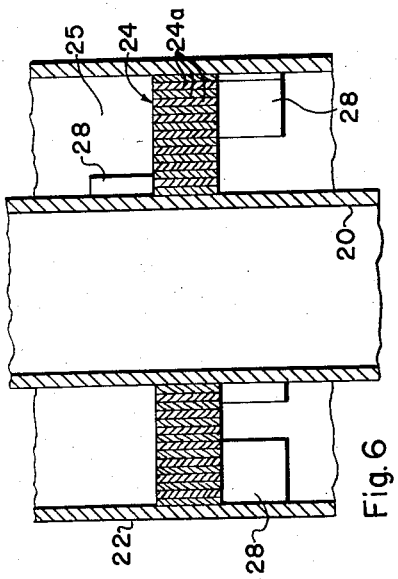

United States Patent Office 2,871,042
Patented Jan. 27, 1959

2,871,042

SUPPORTING AND HEAT INSULATING MEANS

Bascom W. Birmingham, Edmund H. Brown, Russell B. Scott and Peter C. Vander Arend, Boulder, Colo., assignors to the United States of America as represented by the United States Atomic Energy Commission Application June 2, 1954, Serial No. 434,096

2 Claims. (Cl. 287—20)

The present invention relates generally to heat insulating method and means and more particularly to method and means adapted to support loads with minimum heat conductivity through the load supporting means.

In many instances, particularly in connection with cryogenic work, it is desirable to support a load with minimum heat conduction through the load supporting means. For example, where the load comprises a conduit that is to contain liquified gas such as liquid oxygen, liquid hydrogen, etc., the conduit is normally supported by some means in spaced relationship with respect to a surrounding jacket or outer conduit and the intermediate space is at least partially vacuumized; it is essential that heat conduction or flow through the supporting means be kept as low as feasible and practicable in order to minimize or prevent evaporation of the cold liquid. The problem of finding suitable supporting means is a difficult one as materials embodying requisite support strength generally conduct excessive heat from the relatively warm supporting member to the much colder supported conduit or member. Substituting known types of insulating materials for supporting the load and simultaneously retaining it in spaced relationship from the supporting member gives rise to such difficulties as lack of requisite physical strength to support the load, requirement for unduly high vacuum around it and in the space intermediate the supported and the supporting members, prohibitive expense, etc.

The present invention aims to overcome the above and other difficulties or disadvantages by providing new and improved means of relatively simple and inexpensive construction which is adapted to support loads in isolated relationship with respect to supporting members with minimum heat conduction through the load supporting means. The invention further contemplates the provision of combined load-supporting and heat-insulating means adapted to provide maximum heat insulation under relatively low vacuum conditions.

An object of the present invention is to provide a new and improved method of supporting and heat insulating a load.

Another object of the present invention is to provide new and improved heat insulating means.

Another object of the invention is to provide new and improved means adapted to support relatively heavy loads.

Another object of the invention is to provide new and improved heat insulating means of relatively simple and inexpensive construction.

Still another object of the invention is to provide new and improved combined load-supporting and insulating means, the heat flow characteristics of which may be readily varied.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings,

Fig. 1 is an end view of a construction embodying a preferred embodiment of the present invention;

Fig. 2 is a cross-sectional view taken along line 2—2 of Fig. 1;

Fig. 3 is an end view of a form of the invention generally similar to that of Figs. 1 and 2, which is adapted to minimize lateral movement of supported loads;

Fig. 4 is a sectional view taken along line 4—4 of Fig. 3;

Fig. 5 is an end view of another form of the invention, generally similar to that of Figs. 1 and 2, which is particularly adapted to support loads against lateral movement;

Fig. 6 is a sectional view taken along line 6—6 of Fig. 5; and

Fig. 7 is a sectional view showing the present invention utilized to support a load against endwise or lateral movement.

Referring more particularly to Figs. 1 and 2 of the drawings, there is shown an inner member or element 1, which may be, for example, a support rod or conduit for carrying a cold liquid and which for purposes of description will be referred to as the supported member, a supporting member or element 2, and combination supporting and insulating means 4 comprised of a plurality of stacked layers of generally annular configuration. The supported and supporting members 1 and 2 are in normal conditions of operation separated by a space 5 which is under at least partial vacuum, to thereby minimize heat conduction via intermediate gas. To further minimize heat transfer to the cold supported conduit or member 1, the latter may be polished or wrapped with an aluminum or other reflecting material so as to reduce radiation.

The present invention is more particularly concerned with minimizing heat flow to the cold supported member 1 by solid conduction through the generally annular weight-supporting means 4, and this is achieved by forming the means 4 from a plurality of layers or elements 4a disposed in stacklike formation or arrangement intermediate the supporting and supported members.

The individual layers or elements 4a are located in the rarefied or vacuumized space 5 between the supported and supporting elements with their ends or edges exposed to the vacuum condition existing therein. It has been discovered that building up the support means 4 from a plurality of layers or individual stacked elements with vacua-exposed edges gives very unexpected and superior insulating effects and provides means capable of supporting any desired load. The heat conductivity achieved with the illustrated constructions is in some instances as great as 1/200th that of a solid piece of material which may be employed in lieu of the stacked elements, and such greatly decreased heat flow may be obtained at relatively low vacuum conditions in the space 5. A very marked decrease in heat conductivity therethrough occurs when the pressure in the space 5 is reduced to a value of about one millimeter of mercury; as the pressure is further reduced the insulating effect becomes even greater, but at a lower rate.

It is believed that the reason for the rather abrupt drop in heat conductivity through the combination insulating and support means 4 when the pressure is reduced to about one millimeter of mercury is that at this pressure the mean free molecular path of such gas as remains in spaces between the layers or elements 4a is of the same order as, or larger than, the mean distance between adjacent surfaces of the layers, elements or "washers" 4a in the stack. Even though the various layers or elements 4a are in load supporting contact, the total mechanical or physical contact area is actually small and there exists between the surfaces, by reason of minute surface irregularities, a mean distance which is very small and from which spaces gas molecules are withdrawn as pressure in the space 5 is lowered; when immersed in air or other gases, lowering the pressure to about one millimeter of mercury sharply reduces heat conduction between the two surfaces as heat conduction is largely due to conduction by gas molecules that are disposed in the minute spaces between the elements.

Experiments show that the foregoing obtains even with stacked layers or elements 4a having surfaces that have been polished as smooth as practicable and it is believed that even in such instances a pressure reduction in the space 5 to the point where the mean free path to the gas molecules is of the same order as the mean distance between adjacent surfaces of elements 4a causes gas conduction between the surfaces to drop sharply and suddenly (the "drop" pressure being to about one millimeter of mercury). The fact that heat flow drop may be obtained without resorting to a high vacuum in the space 5 is of great importance as such pressure may be obtained with rough vacuum pumping equipment, for example, mechanical pumps that are capable of providing vacua in the range one tenth to one one-thousandth of a millimeter of mercury, as compared with oil or mercury diffusion pumps for providing vacua in the range $10^{-6}$ to $10^{-7}$ millimeters of mercury.

The described heat flow effect may be controlled by including in the combination a desired number of layers 4a as heat flow through the support means 4 is through a succession of "$n$" similar sets of contacts, each of which acts as a discrete thermal resistance and thus heat flow may be reduced by "$n$" times the reduction of a single set of contacts.

Preferably no adhesive, bonding material, or other plastic or soft material is sandwiched between adjacent surfaces of the layers 4a, but they are cleaned prior to their assembly into the unit 4 to thus prevent conduction through material which might otherwise fill or at least partially fill the spaces between adjacent surfaces of the laminae 4a.

While various materials and dimensions may be used for the layers 4a, excellent heat insulating and load supporting effects are obtainable with relatively hard materials of low conductivity, for example, various types of stainless steel, and monel metal, and hence they are preferred as compared to softer materials of greater heat conductivity such as copper and aluminum. With stainless steel or monel metal excellent results are obtainable with thicknesses about one-half to four or five thousandths of an inch. The widths of the laminae 4a across adjacent contact faces may be, for example, about one-half to one inch, or as otherwise appropriate for carrying a desired load.

The form of the invention shown in Figs. 1 and 2 is particularly adapted to support loads applied axially or longitudinally of the supported element 1. With this arrangement the layers 4a may be retained against excessive lateral or radial movement by generally radially disposed, circumferentially spaced fins 8, which are preferably thin and in loose or poor contact with the layers 4a and supporting member 2.

The form of the invention shown in Figs. 3 and 4 is particularly adapted to support a load, for example, a rod or conduit 10, against both axial and lateral or radial movement. To achieve this, the layers or elemnets 14a of the generally annular stacklike support means 14 are of generally conical configuration and the latter rests at one stack surface against a complementary surface 15 of the support member 12 and at an opposite stack surface against a complementary surface 16 of a nut or flange 17 that is carried by and projects laterally from the supported member 10. The space 18 between supported and supporting members may be at least partially exhausted of gas as referred to in connection with Figs. 1 and 2. This arrangement tends to minimize movement of the supported and supporting members 10 and 12 with respect to each other laterally as well as longitudinally.

The form of the invention illustrated in Figs. 5 and 6 is particularly useful in preventing lateral movement of a supported conduit, rod, or other load 20 with respect to a supporting member 22, which may be a conduit surrounding the inner member 20. In this modification the generally annular stacklike combination supporting and heat insulating means 24 is shown of spiral configuration and may be obtained by placing thin coiled strip or strips around the supported member 20 to form the layers 24a. A single strip may be coiled upon itself to completely fill the space 25 or a plurality of strips may be coiled and fitted one over the other so as to fill the space; a plurality of such coiled strips has the advantage of permitting spacing apart of the strip terminal portions to thereby minimize heat flow by conduction along the strip from a supporting to supported member, or vice versa. The strip or strips may be coiled with sufficient tightness and fitted into firm engagement with the supported and supporting members to minimize longitudinal movement of one with respect to the other. For practical reasons the coiled construction is preferable to forming the insulating-supporting means 24 from a plurality of cylinders fitted one over another.

The layers 24a may be given stability axially or longitudinally of the member 20 by radially extending fins or rods 28, preferably so disposed that those on opposite sides of the insulating-supporting layers are out of alignment with each other; this construction minimizes heat transfer along the fins and is preferable to employing single fins projecting from the supporting member 22 to a location closely adjacent the exterior of the supported member 20, or vice versa.

In Fig. 7 there is shown a form of the invention for simultaneously insulating a shaft or member 35 and supporting it against both longitudinal and lateral movement. The shaft 35 is supported against lateral movement and insulated by combined insulating-supporting laminae 24b, similar to that of Figs. 5 and 6, and against longitudinal or axial movement by combined insulating-supporting laminae 4b and 4c, similar to that of Figs. 1 and 2. The laminae 4b hold the shaft against movement toward the left of Fig. 7 and the laminae 4c hold the shaft against movement toward the right of Fig. 7.

The layers 4b are shown restrained against lateral movement by pins 37 disposed adjacent outer edges of the layers, but preferably in poor physical contact therewith, and the layers 4c may be retained against lateral movement by a pin 38 which extends through an aperture of the stack 4c, with the pin 38 in poor physical contact with or spaced from end edges of the layers. The spaces in which these various load supporting and insulating means are disposed will be vacuumized as previously described.

Materials utilized for the combination load-supporting and insulating means of Figs. 3 through 7 may be similar to those referred to in connection with the embodiment of the Figs. 1 and 2. The dimensions may also be similar, e. g., that of Figs. 5 and 6 may comprise a coil with layers one-half to four or five thousandths thick, a radially extending dimension about one inch, and a layer width about one-half to one inch.

It will be seen that the present invention provides new and improved method and means of relatively simple and inexpensive construction which is adapted to support relatively heavy loads and to simultaneously insulate supported and supporting parts from each other. The thin layers do not have to be held spaced from each other by auxiliary means, but are in intimate mechanical contact and hence capable of withstanding the mechanical loads comparable to those supported by blocks of solid metal from which the layers are formed; for stainless steels the combined supporting-insulating means of the present invention is adapted to support loads in the order of 30,000 pounds per square inch. With the present invention, even though the actual mechanical or physical contact between adjacent supporting surfaces is small, no matter how highly polished the surfaces, heat conduction through the device is minimized at vacuum conditions obtainable with rough vacuum pumps. Heat conduction or flow through the device drops sharply and suddenly when the pressure reaches a value only slightly below atmospheric, namely, about one millimeter of mercury.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. Means for simultaneously supporting inner and outer members spaced from each other and heat insulating them from each other comprising an outer member, an inner member, said members together defining an annular cavity, a shoulder carried by the outer member and projecting toward the inner member, a shoulder carried by the inner member and projecting toward the outer member, a stack of annular metal plates in said cavity and held between the shoulder of the outer member and the shoulder of the inner member, edges of the metal plates forming the stack being exposed to said cavity and to evacuation conditions which may exist within said cavity, said stack of metal plates serving to both support one of said members with respect to the other and as a heat insulator.

2. Means as claimed in claim 1, in which there is also provided in said cavity between the inner and outer members an annular stack of metal layers having edges exposed to the cavity and to evacuation conditions which may exist therein and acting to both support one of said members with respect to the other and as a heat insulator.

References Cited in the file of this patent

UNITED STATES PATENTS

| | | |
|---|---|---|
| 758,457 | Macfarlane | Apr. 26, 1904 |
| 978,930 | O'Malley | Dec. 20, 1910 |
| 1,029,364 | Hartwig | June 11, 1912 |
| 1,180,812 | Wolf | Apr. 25, 1916 |
| 1,521,148 | Dennett et al. | Dec. 30, 1924 |
| 1,738,652 | Hulse | Dec. 10, 1929 |
| 1,824,528 | Bailey | Sept. 22, 1931 |
| 2,396,459 | Dana | Mar. 12, 1946 |
| 2,513,749 | Schilling | July 4, 1950 |

FOREIGN PATENTS

| | | |
|---|---|---|
| 993,253 | France | of 1951 |